(12) United States Patent

Nichols

(10) Patent No.: US 10,141,010 B1
(45) Date of Patent: Nov. 27, 2018

(54) AUTOMATIC CENSORING OF OBJECTIONABLE SONG LYRICS IN AUDIO

(71) Applicant: Google Inc., Mountain View, CA (US)

(72) Inventor: Eric Paul Nichols, San Francisco, CA (US)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 14/872,769

(22) Filed: Oct. 1, 2015

(51) Int. Cl.
*G10L 15/00* (2013.01)
*G10L 15/02* (2006.01)
*G10L 15/04* (2013.01)
*G10L 15/08* (2006.01)
*G10L 17/00* (2013.01)
*G10L 25/51* (2013.01)

(52) U.S. Cl.
CPC .............. *G10L 25/51* (2013.01); *G10L 15/02* (2013.01); *G10L 15/08* (2013.01); *G10L 2015/025* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 7,464,034 | B2* | 12/2008 | Kawashima | G10L 13/033 704/246 |
| 8,255,293 | B1* | 8/2012 | Davies | G06Q 30/0207 705/14.49 |
| 8,548,810 | B2* | 10/2013 | Rodriguez | G06T 1/0071 382/100 |
| 8,671,165 | B2* | 3/2014 | Davis | G06Q 20/04 709/219 |
| 8,831,953 | B2* | 9/2014 | Vanjani | G10L 15/183 704/1 |
| 2006/0217966 | A1* | 9/2006 | Hu | G06F 17/30743 704/200 |
| 2007/0192104 | A1* | 8/2007 | Blewett | G10L 15/142 704/256 |
| 2007/0260456 | A1* | 11/2007 | Proux | H04M 1/72552 704/235 |
| 2008/0267416 | A1* | 10/2008 | Goldstein | H04R 1/1091 381/56 |
| 2009/0083784 | A1* | 3/2009 | Cormack | H04H 60/37 725/25 |
| 2009/0164217 | A1* | 6/2009 | Arrowood | G10L 15/14 704/254 |

(Continued)

*Primary Examiner* — Richemond Dorvil
*Assistant Examiner* — Thuykhanh Le
(74) *Attorney, Agent, or Firm* — Lowenstein Sandler LLP

(57) ABSTRACT

Embodiments relate to censoring audio data. A censoring system receives audio data including a song tag and amplitude data as a function of time. The amplitude data represents spoken words occurring over a duration, as well as non-spoken word sound overlapping with some of the spoken words during the duration. The system accesses a set of song lyrics and processes the set of song lyrics and the amplitude data together to identify timestamps in the amplitude data. These timestamps indicate a time during the duration when one of the words from the lyrics begins in the amplitude data. The system compares the words in the set of song lyrics to a blacklist and adjusts the amplitude data at the timestamps of blacklisted word occurrences to render the audio at the blacklisted words incomprehensible. The system outputs the adjusted amplitude data.

22 Claims, 8 Drawing Sheets

(56) References Cited

U.S. PATENT DOCUMENTS

| | | | | |
|---|---|---|---|---|
| 2010/0094630 A1* | 4/2010 | Yoakum | G06F 17/30746 | 704/254 |
| 2010/0179811 A1* | 7/2010 | Gupta | G10L 15/22 | 704/235 |
| 2011/0066437 A1* | 3/2011 | Luff | G06Q 30/02 | 704/254 |
| 2011/0270609 A1* | 11/2011 | Jones | H04M 3/56 | 704/235 |
| 2012/0105719 A1* | 5/2012 | Fratti | H04N 21/8106 | 348/462 |
| 2012/0239403 A1* | 9/2012 | Cano | G10L 15/02 | 704/254 |
| 2013/0231930 A1* | 9/2013 | Sanso | G10L 15/26 | 704/235 |
| 2014/0019133 A1* | 1/2014 | Bao | G10L 15/22 | 704/257 |
| 2015/0199961 A1* | 7/2015 | Arkko | G10L 15/22 | 704/251 |
| 2015/0279351 A1* | 10/2015 | Nguyen | G10L 15/02 | 704/251 |
| 2015/0302848 A1* | 10/2015 | Kurata | G10L 15/187 | 704/254 |
| 2015/0302855 A1* | 10/2015 | Kim | G10L 17/22 | 704/275 |
| 2015/0339390 A1* | 11/2015 | Urdiales Delgado | G10L 25/54 | 707/711 |
| 2016/0005398 A1* | 1/2016 | Kingsbury | G10L 15/083 | 704/254 |
| 2016/0019882 A1* | 1/2016 | Matula | G10L 15/187 | 704/254 |
| 2016/0118039 A1* | 4/2016 | Moon | G10L 15/063 | 704/239 |
| 2016/0171100 A1* | 6/2016 | Fujita | G06F 17/30 | 707/722 |
| 2016/0284345 A1* | 9/2016 | Ji | G10L 15/08 | |

\* cited by examiner

Path Likelihood Matrix 440

| | 442 | 444 | 446 |
|---|---|---|---|
| | time seg. 401A | time seg. 401B | Probability |
| | 402 | 412 | 0.97 |
| | | 414 | 0.26 |
| | | 416 | 0.13 |

FIG. 4B

Path Likelihood Matrix 450

| | 442 | 444 | 456 | 458 |
|---|---|---|---|---|
| | time seg. 401A | time seg. 401B | time seg. 401C | Probability |
| | 402 | 412 | 420 | 0.9312 |
| | | | 422 | 0.6693 |
| | | | 426 | 0.0291 |
| | | 414 | 422 | 0.1794 |
| | | | 424 | 0.1248 |
| | | | 426 | 0.0078 |
| | | 416 | 422 | 0.0897 |
| | | | 426 | 0.0039 |

FIG. 4C

| Path Likelihood Matrix 550 | time seg. 401A | time seg. 401B | time seg. 401C | time seg. 401D | time seg. 401E | Probability |
|---|---|---|---|---|---|---|
| sub-path 512 | 402 | 412 | | | | 0.97 |
| sub-path 514 | 402 | 412 | 420 | | | 0.9312 |
| sub-path 516 | 402 | 412 | 420 | 432 | | 0.0372 |
| path 518 | 402 | 412 | 420 | 432 | 434 | 0.0026 |

| Path Likelihood Matrix 560 | time seg. 401A | time seg. 401B | time seg. 401C | time seg. 401D | time seg. 401E | Probability |
|---|---|---|---|---|---|---|
| sub-path 522 | 402 | 414 | | | | 0.26 |
| sub-path 524 | 402 | 414 | 422 | | | 0.1794 |
| sub-path 526 | 402 | 414 | 422 | 436 | | 0.1776 |
| path 528 | 402 | 414 | 422 | 436 | 438 | 0.1723 |

AUTOMATIC CENSORING OF OBJECTIONABLE SONG LYRICS IN AUDIO

BACKGROUND

1. Field of the Disclosure

This disclosure pertains in general to audio processing and more specifically to censoring audio data based on song lyrics.

2. Description of the Related Art

Audio data often contain "explicit" lyrical content, words that are objectionable to some listeners. Traditionally, music labels manually create a censored version of the audio data with the explicit lyrical content removed or otherwise obscured with noise or tones to make the offensive lyrical content inaudible. An increased number of music producers are uploading audio data to websites such as YouTube™ and Google Play Music™. The audio data uploaded by these producers often times contain explicit lyrical content. Unlike traditional music labels, these producers often do not go through the effort of manually creating a censored version of the audio data.

SUMMARY

A system is provided that allows for automatic censoring of audio data. A censoring system receives audio data including a song tag and amplitude data for audible frequencies as a function of time. The amplitude data represents spoken words (e.g., singing, rapping, etc.) occurring over a duration, as well as non-spoken word sound overlapping with some of the spoken words during the duration. The system accesses a database using the song tag and obtains a set of song lyrics. The system compares the words in the set of song lyrics to a blacklist to identify a set of blacklisted words. The system processes the set of song lyrics and the amplitude data together to identify timestamps in the amplitude data. These timestamps indicate a time during when one of the words from the set of song lyrics occurs in the amplitude data. The system adjusts the amplitude data between start and end timestamps of the blacklisted word occurrences to render the audio at the blacklisted words incomprehensible. The system outputs the modified audio data including the adjusted amplitude data.

BRIEF DESCRIPTION OF THE DRAWINGS

The teachings of the embodiments disclosed herein can be readily understood by considering the following detailed description in conjunction with the accompanying drawings.

Figure (FIG. 1 illustrates a block diagram of a computing environment including a system for censoring audio data, according to one embodiment.

FIG. 4B illustrates an example path likelihood matrix for use in identifying time stamps of lyrical content, according to one embodiment.

FIG. 4C illustrates another example path likelihood matrix, according to another embodiment.

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures.

DETAILED DESCRIPTION

I. Configuration Overview

An automatic censoring system creates a censored version of audio data with explicit lyrical content removed or otherwise obscured to make offensive lyrical content inaudible. Automatically creating the censored audio data advantageously removes the effort of manually creating censored audio data, thereby saving the time and resources required to do it manually using traditional techniques. The automatic censoring system processes the audio data together with song lyrics for the audio data to associate start and end timestamps to each word in the song lyrics. Achieving sufficient accuracy in the timestamps for particular song lyrics while also ensuring that the process is automatic and is not prohibitively expensive from a computer processor or data storage perspective is a difficult challenge. In processing the audio data together with the song lyrics to determine the timestamps, a finite state machine with hundreds of millions of possible states, and exponentially more possible paths among these states, must be analyzed to achieve the desired accuracy in timestamp matching for audio lyrics. The logic supporting the finite state machine to determine the timestamps for song lyrics is further designed to reduce storage and processing demands.

The audio data includes a song tag and amplitude data for frequencies as a function of time. The song tag identifies the song associated with the audio data. The song tag can include title, duration, artist, album, genre, release date, track number, etc. The amplitude data for music consists of both spoken words (e.g., singing) as well as non-spoken word sounds (e.g., drums, electronic sounds, guitar sounds, outdoor ambient noise, etc.) overlapping at some of the spoken words. Other types of amplitude data, such as spoken word albums or audiobooks, will include only spoken words.

The audio data can be in an uncompressed state or a compressed state. In addition to the song tag and the amplitude data, the uncompressed audio data includes additional information such as sample rate, bit depth, number of channels, etc. The additional information increases the overall audio data information. The uncompressed audio data can be compressed to reduce the audio data information.

II. Computing Environment

Figure 1:
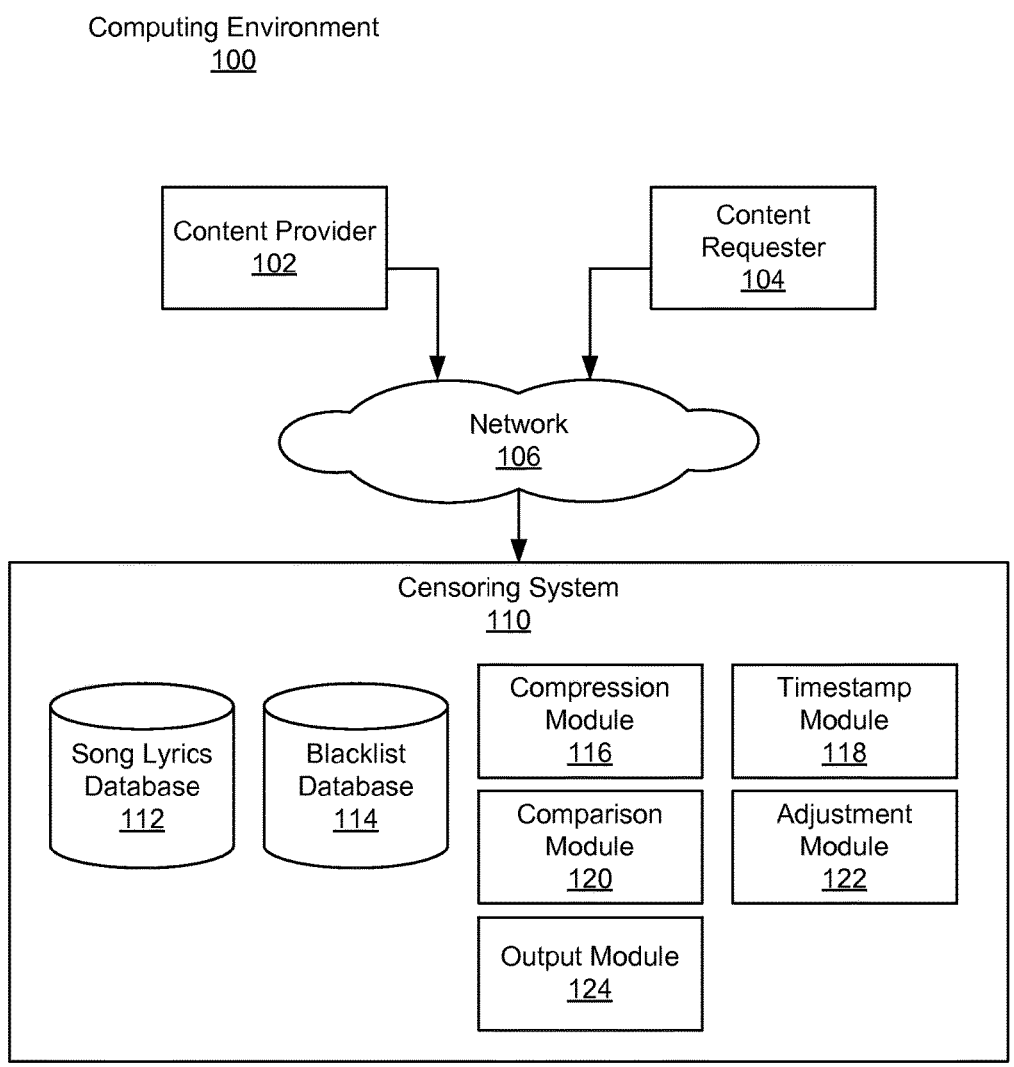

FIG. 1 illustrates a block diagram of a computing environment 100 for censoring audio data such as songs, the audio component of videos, or streamed audio content. The computing environment 100 allows the exchange of censored audio data between a provider and a requester via a computer network 106. The computing environment 100 includes a content provider 102, a content requester 104, and a censoring system 110. Each of these entities includes computing devices that may be physically remote from each other but which are communicatively coupled by the computer network 106. The network 106 is typically the Internet, but can be any network(s), including but not limited to a LAN, a MAN, a WAN, a mobile wired or wireless network, a private network, a virtual private network, or a combination thereof.

The content provider 102 provides access to audio data. Examples of content providers 102 include content creators, such as music publishers, record labels, and independent artists. Content providers 102 also include audio hosting and streaming sites, search engines, advertisers, and social network sites.

The content requester 104 requests audio data from a content provider 102 via the network 106. In one example, the content requester 104 is a computing device that executes software instructions in response to client inputs, e.g., a general purpose web browser or a dedicated application, both of which are configured to connect to the content provider 102 via the network 106 and to access and play back audio data. The content requester 104 can be, for example, a personal computer, a laptop, a personal digital assistant, a cellular, mobile or smart phone, a set-top box or any other network enabled consumer electronic ("CE") device.

The request for the audio data can include any known identifier for the audio data, examples of which include a title, artist, album, genre, radio station including the audio data, an audio (or video) stream including audio data, etc. In response to the request, the content provider 102 sends the audio data to the content requester 104 via the network 106. The audio data includes at least a song tag, and audio amplitude data of a time domain signal.

The censoring system 110 takes as input uncensored audio data, and outputs censored audio data. The censoring system 110 can interact with and exchange audio data with both the content provider 102 and the content requester 104. In some embodiments, the censoring system 110 outputs censored audio data responsive to a request from the content requester 104 for the censored audio data. In other embodiments, the censoring system 100 outputs censored audio data to the content provider 102 for storage and later retrieval at the content provider 102. The censoring system 110 includes a song lyrics database 112, a blacklist database 114, a compression module 116, a timestamp module 118, a comparison module 120, an adjustment module 122, and an output module 124. In alternative configurations, different or additional components can be used.

The song lyrics database 112 stores lyrics (or "song lyrics") for audio data. The song lyrics are text that make up a song and consist of text for spoken words of the audio data. The song lyrics may, for example, be provided by the content provider 102. The blacklist database 114 also stores a set of "explicit" words describing objectionable or offensive words to be censored. The explicit words can be provided by the content provider 102 or the content requester 104. The blacklist database 114 may also specify that particular sets of explicit words are to be applied to all song lyrics, or only to subsets of song lyrics, such as those owned or provided by a particular artist, content provider, content requester, content requester demographic (e.g., age), geographic region, etc. Generally, the content provider 102 or requester 104 may decide what set of explicit words are to be used in the censoring of any piece of audio data.

The compression module 116 may compress the received audio data if the audio data is received in an uncompressed state. Compressing the uncompressed audio data reduces the resources needed to store and process the audio data. In part, the compression module 116 may compress the audio data by removing all information in the audio other than the song tag and the amplitude data. The compression module 116 may further compress the audio data by removing frequency data associated with frequencies that are inaudible to the human ear (e.g., frequencies data below 20 Hz and above 20 kHz). The compression module 116 may further downsample the amplitude data and filter the high frequencies within the range of audible frequencies. The compression module 116 may also compress the audio data using conventional audio compression techniques such as by compressing the uncompressed audio data into an MPEG-1 or MPEG-2 Audio Layer III (MP3) format.

The timestamp module 118 processes the set of song lyrics and the amplitude data together to identify timestamps when one of the words from the set of song lyrics occurs in the amplitude data. This may include starting and ending timestamps for words or subparts (e.g., phonemes) of words. The timestamp module 118 is described in further detail in Section III below.

The comparison module 120 compares, for an item of audio data to be censored, each word in the set of song lyrics associated with the audio data, as stored by the lyrics database 112, against a blacklist, as stored by the blacklist database 114, to identify a subset of words to be censored. The comparison module 120 can also access the timestamp data for the audio data generated by the timestamp module 118 to determine a set of starting and ending timestamps of the words to be censored.

The adjustment module 122 adjusts the amplitude data of the audio data to be censored at timestamps of the blacklisted words to render the audio data incomprehensible to a listener. In one embodiment the adjustment module 122 adjusts the amplitude data to 0 decibels (dB) between the starting and ending timestamps of the blacklisted words. In another embodiment, the adjustment module 122 replaces the amplitude data between the starting and ending timestamps of the blacklisted words with other amplitude data such as a single tone, inaudible buzzing or sounds, or whatever amplitude data the requester 102 or provider 104 chooses.

The output module 124 sends, or otherwise outputs, the modified audio data to the content requester 104. The output module 124 can also perform format conversion (transcoding), compression, decompression, metadata tagging, and other processing tasks on the audio data.

III. Timestamp Module

Figure 2:
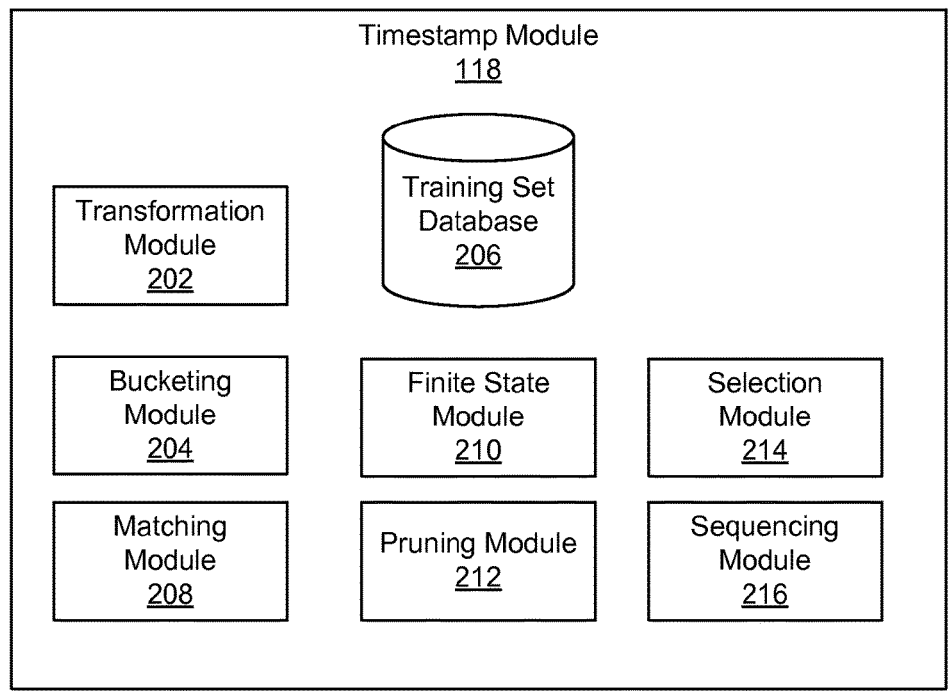
FIG. 2 illustrates a block diagram of the logical components of a timestamp module for processing song lyrics and audio amplitude data together to identify timestamps when words from the song lyrics occur in the audio amplitude data, according to one embodiment.

FIG. 2 illustrates a block diagram of the logical components of the timestamp module 118 of FIG. 1, according to one embodiment. As introduced previously, the timestamp module 118 processes a set of song lyrics and amplitude data together to identify timestamps indicating a start and stop time and/or duration when words from the set of song lyrics occur in the amplitude data. The timestamp module 118 includes a transformation module 202, a bucketing module 204, a training set database 206, a matching module 208, a finite state module 210, a pruning module 212, a selection module 214, and a sequencing module 216.

The censoring system 110 of FIG. 1 generally receives amplitude data within the audio data in the form of a time domain signal. The transformation module 202 samples the received amplitude data. The samples of the sampled audio data include amplitude data as a function of frequency and time. The sampling frequency may vary; one example is that sampling may occur at twice the Nyquist frequency (e.g., 44,000 samples per second). The transformation module 202 groups the sampled audio data into a number of time segments (also referred to as "audio frames"). Each time segment includes one or more samples, or portions thereof, over a time range. For example, a sample may be 1/44,000 seconds long and a time segment may be 0.01 seconds long. In this example, the time segment includes 440 samples. Further, the time segments may overlap with one another. For example, a time segment may include samples 1 to 440, and a next time segment may include samples 221-660. In this manner, the time segments may partially overlap (in terms of samples) with one another.

Figure 3A:
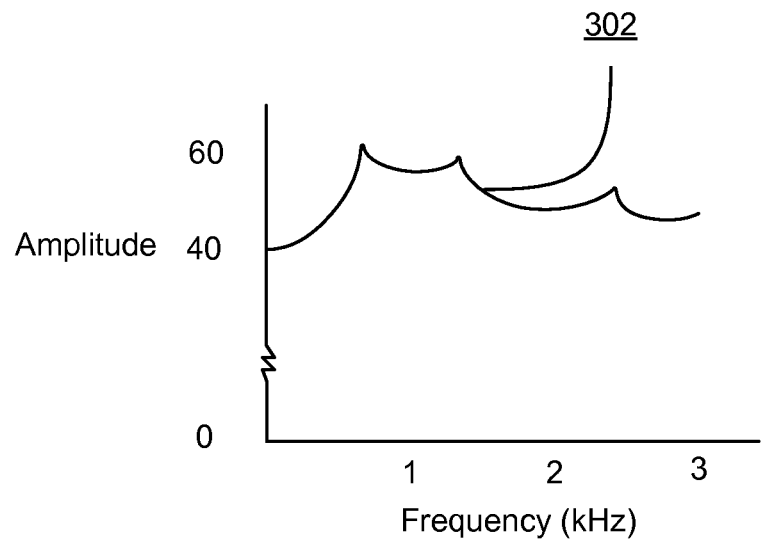
FIG. 3A illustrates a frequency domain amplitude data signal of a snippet of audio data for use in matching the snippet of audio data to identified words, or portions thereof, according to one embodiment.

The transformation module 202 further transforms a time segment, or portion thereof, into a frequency domain amplitude data signal. This may be accomplished via Fast Fourier Transform (FFT) over a time segment, or portion thereof, or any other similar technique. FIG. 3A illustrates an example frequency domain signal 302 corresponding to one time segment of a time domain signal (not shown), according to one embodiment.

Figure 3B:
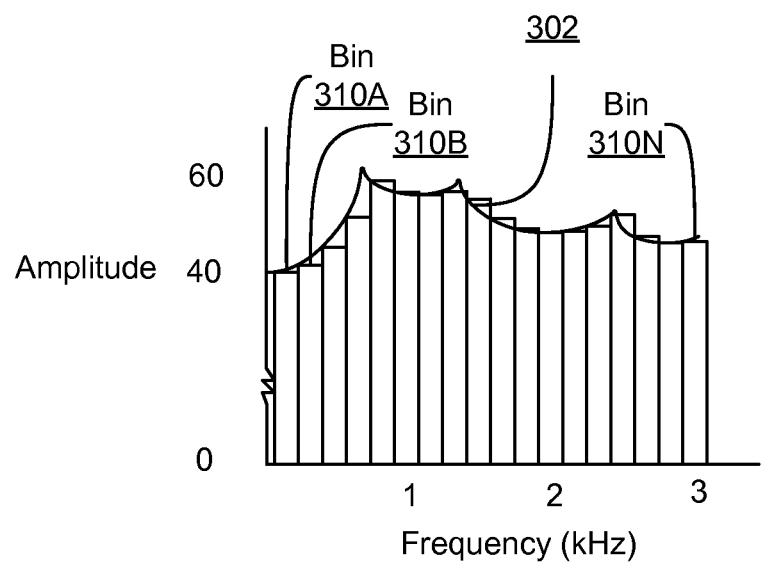
FIG. 3B illustrates a sampled version of the frequency domain amplitude data signal illustrated in FIG. 3A, according to one embodiment.

The bucketing module 204 buckets the frequency domain signal 302 at predetermined frequency intervals forming bins, each bin having an amplitude representing a measure of the frequency amplitudes within the frequency range of the bin. The measure may, for example, be the mean amplitude, median amplitude, maximum amplitude, or minimum amplitude. FIG. 3B illustrates an example binned version of the frequency domain signal 302 corresponding to the one time segment. In this example, the bucketing module 204 buckets the frequency domain signal 302 to form bins 310A-N (collectively "bins 310"). Depending on the implementation, the bucketing interval size can be equal or variable. A smaller bucketing interval size results in more bins, which provides more information and allows for improved performance and recognition of human speech at the expense of processing and storage concerns.

Although this description discusses time segments as determined above, in an alternate embodiment, the data used in the analysis described can be calculated using various techniques, such as a Cascade of Asymmetric Resonators with Fast Acting Compression (CARFAC). The CARFAC signal includes both frequency bins and time lags. The frequency binning technique as described in relation to the bucketing module 204 and the bins 310, and the CARFAC technique are interchangeable and the remainder modules function accordingly regardless of which technique is used to characterize the data for analysis.

The training set database 206 includes training data representing positively identified occurrences of spoken phonemes, that is word sounds, or portions thereof, that were spoken over various non-spoken word sounds, that is over music, ambient noise, etc. Each identified (or known) phoneme is associated with one or more time segments and associated binned amplitudes of frequency domain signals corresponding to that phoneme. The training set database 206 may be organized by categories, each category representing a different phoneme. The identified phonemes (also referred to as "sub-sounds") in that category may represent the same phoneme, but where the phoneme was spoken or sung with different intonation, accent, language, with different background music or ambient noise, etc. In this way, the category as a whole represents all of the different ways and contexts in which that particular phoneme might be spoken by a speaker and heard by a listener. For example, a category may include the phoneme "/th/" recorded over various non-spoken word sounds such as drums, electronic sounds, guitar sounds, outdoor ambient noise, etc. Further, at least one category represents time samples that lack speech (lack a phoneme).

The matching module 208 compares the amplitudes of the bins 310 of the time segments of the audio data against the amplitudes of the bins of the identified phonemes in the training set 206. In some embodiments, the matching module 208 builds a neural network model (e.g., a deep neural network (DNN) or a long short-term memory (LSTM) recurrent neural network). In these embodiments, the neural network model takes as input one or more time segments and generates numerical likelihoods. Generally, identified phonemes will not identically match to the bins 310 of audio data of each time segment, so the matching module 308 instead determines a match likelihood for each identified phoneme in the training set 206. In some embodiments, the match likelihood represents a numerical likelihood that the identified phoneme corresponds to the audio data of that time segment based on the numerical difference between the height (or amplitude) of the individual bins of the time segment compared to the height (or amplitude) of the individual bins of the identified phoneme to be matched.

As an example, the matching module 208 may compare the amplitude data of time segments corresponding to the word "thought." Taking the word one time segment at a time, module 208 compares a current one of the time segments in the word to every identified phoneme in the training set database 206 and determines for each identified phoneme, a match likelihood. The matching module determines the top identified phonemes for the current time segment based on the determined match likelihoods. For example, the matching module 208 determines the top three identified phonemes of the current time segment based on the match likelihoods 0.97, 0.26, and 0.13 for the categories "/ô/", "/th/" and silence, respectively. In this example, the matching module 208 is 97% confident the current time segment is an occurrence of the phoneme "/ô/", 26% confident the current time segment is an occurrence of the phoneme "/th/" and 13% confident the current time segment is an occurrence of silence, or at least no spoken words. It follows also that the likelihood of the current time segment matching another identified phoneme in the training set database 206 is less than 13%.

Figure 4A:
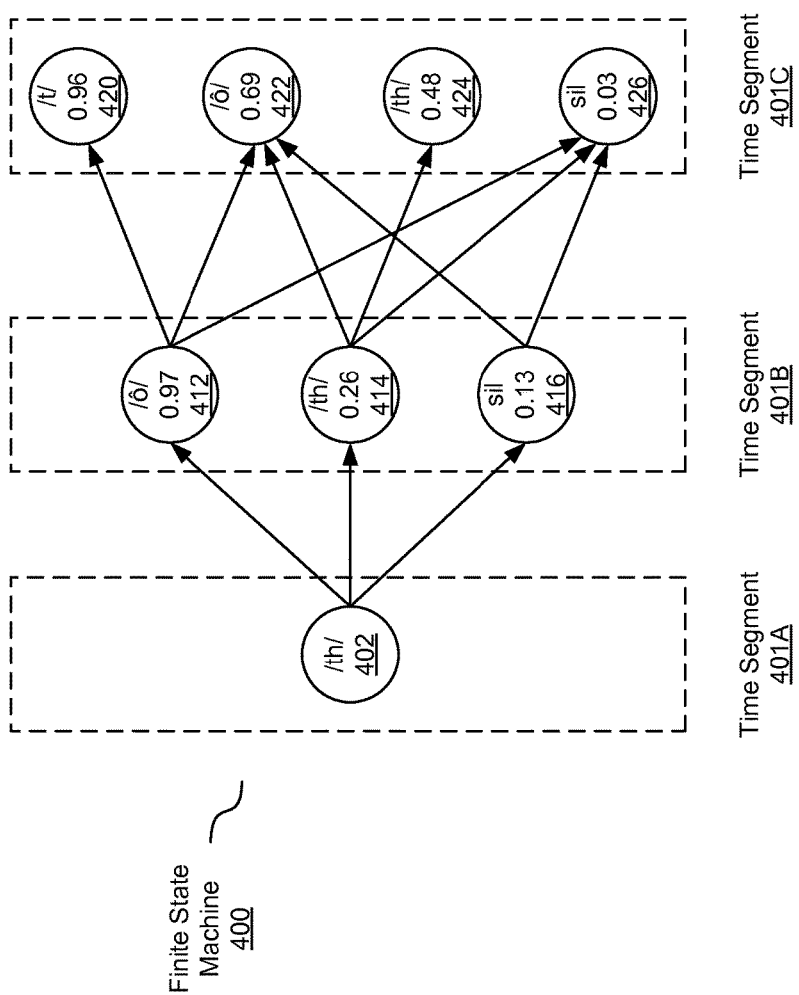
FIG. 4A illustrates an example finite state machine including a number of example states and paths for use in identifying time stamps of lyrical content, according to one embodiment.

FIG. 4A illustrates an example finite state machine 400, according to one embodiment. The finite state module 210 forms a finite state machine 400 including each time segment 401, and for each time segment 401 every identified phoneme in the training set database 206 and associated match likelihoods. Module 210 calculates a path likelihood data set. The path likelihood data set can be stored, for example, in active memory (e.g., Random Access Memory (RAM)). In the finite state machine 400, each identified phoneme is associated with its match likelihood, and represents one possible state for that time segment 401. Each time segment 401 includes a plurality of states.

Each path within the finite state machine 400 represents a selection of an identified phoneme for each time segment for all time segments that have match likelihoods. Effectively, a path represents a selection of an identified phoneme for each time segment 401. Each path is associated with a path likelihood that represents the aggregated match likelihood of all of the identified phonemes that make up that path. As module 208 determines match likelihoods for each identified phoneme for each time segment 401, the finite state machine 400, as stored in active memory, grows, taking up more space. Until pruning occurs (described below), all states and thus paths and associated path likelihoods are stored in active memory as more matches are made.

In one embodiment, the finite state machine 400 further includes likelihoods associated with transitions from one time segment (e.g., time segment 401A) to the next time segment (e.g., time segment 401B). In this embodiment, a path likelihood represents the aggregate match likelihood of all of the identified phonemes that make up that path as well as the transition likelihood associated with a transition from one state (e.g., a first identified phoneme for a first time segment) to the next state in a next time segment (e.g., a second identified phoneme for a second time segment following the first time segment).

FIG. 4A continues the example introduced above. In FIG. 4A, the finite state machine 400 includes time segments 401A, 401B, and 401C. The finite state machine 400 includes the top identified phonemes for each time segment 401A, 401B, and 401C based on the associated match likelihoods. The finite state machine 400 starts at state 402 (the most likely identified phoneme in the training set database 206, based on the match likelihood) and can transition to one of three states: 412, 414, and 416 (the most likely identified phonemes, based on the match likelihoods). The states 412, 414, and 416 can transition to states 420, 422, 424, and 426 (the most likely identified phonemes, based on match likelihoods). As illustrated in FIG. 4A, state 412 can transition to one of three most likely states: 420, 422, and 426. Similarly, state 414 can transition to one of three most likely states: 422, 424, and 426, and state 416 can transition to one of two most likely states: 422 and 426. The arrows indicate possible transitions from one state to the next possible state for the most likely states for the times segments 401A, 401B and 401C.

Continuing the example, the time segment 401A includes state 402 representing the category "/th/". The time segment 401B includes possible states 412, 414, and 416 representing categories "/ô/", "/th/" and silence, respectively. Each state has an associated match likelihood representing a numerical likelihood that the audio data of that time segment 401 corresponds to a particular identified phoneme. States 412, 414, and 416 correspond to the previous example including phonemes "/ô/", "/th", and silence and associated match likelihoods. The time segment 401C includes states 420, 422, 424, and 426 representing "/t/", "/ô/", "/th/", and silence, respectively. The states 420, 422, 424, and 426 also have associated match likelihoods.

FIG. 4B illustrates an example path likelihood matrix 440, as stored in active memory, including possible paths from time segment 401A to 401B and associated path likelihoods for the most likely states for the time segments 401A and 401B, according to one embodiment. The finite state module 210 calculates the path likelihoods for the paths in the finite state machine 400 from time segment 401A to 401B and stores the possible paths from 401A to 401B and associated path likelihoods in the path likelihood matrix 440. The path likelihood matrix 440 can include the individual state likelihoods, paths, and aggregate path likelihoods for all possible transitions from states of the time segment 401A to states of the time segment 401B (all but the top identified phonemes/possible states are omitted as in FIG. 4A for clarity). The path likelihoods represent the aggregate likelihood of the states that make up that path. Column 442 represents the most likely identified phoneme based on match likelihood for the time segment 401A, column 444 represents the most likely identified phonemes based on match likelihoods for the time segment 401B, and column 446 represents the path likelihood, that is the aggregate likelihood of all possible states that make up the path. For example, the path likelihood 0.26 indicates the finite state module 210 is 26% confident state 414 follows state 402. That is, the finite state module 210 is 26% confident that the phoneme "/th/" is followed by the same phoneme again, "/th/", in the audio data. A repeat of a phoneme like this represents a common occurrence in songs, where a singer will hold a particular note or sound for an extended period of time, even though the song lyrics only indicate that the word is simply present in the song. Additionally, if each time segment partially repeats some audio data/samples from the previous time segment, many phonemes will extend across multiple time segments, and thus it is common for this to be reflected in the likelihoods of particular identified phonemes appearing multiple times in a row for sequential time segments.

FIG. 4C illustrates another example path likelihood matrix 450, as stored in active memory, storing possible paths from time segment 401A to 401B to 401B and associated path likelihoods for the most likely states of the time segments 401A, 401B, and 401C, according to one embodiment. The finite state module 210 calculates the path likelihoods for the paths illustrated in the finite state machine 400 from time segment 401A to 401B to 401C and stores the possible paths and calculated path likelihoods in active memory. The path likelihood matrix 450 can include the individual state likelihoods, paths, and aggregate path likelihoods for all possible states of the time segment 401A, all possible states of the time segment 401B, and all possible states of the time segment 401C (again all but the top identified phonemes/possible states are omitted as in FIGS. 4A and 4B for clarity). Columns 442 and 444 are the same as in FIG. 4B. Column 456 represents the most likely identified phonemes based on match likelihoods of the time segment 401C and column 458 represents the path likelihood. The path likelihoods represent the aggregate likelihood of the states that make up that path. For example, the likelihood 0.9312 indicates the finite state module 210 is 93.12% confident state 420 follows state 412 which follows state 402. That is, the finite state module 210 is 93.12% confident that the phoneme "/t/" follows phoneme "/ô/" which follows phoneme "/th/" resulting in the sequence of phonemes forming the entire word "thought".

Thus, FIG. 4B and FIG. 4C together illustrate the segment-by-segment growth of the path as stored in active memory and the finite state machine 400 as the matching module 208 compares new time segments to identified phonemes. Determining all possible paths and associated path likelihoods throughout the duration of a typical song, let alone a longer item of audio data such as the soundtrack to a movie, quickly becomes cumbersome from a data processing and storage perspective. For example, a three minute long song sampled at a rate of 44,000 samples per second will contain 7.92 million samples. The 7.92 million samples can be segmented into 18,000 time segments, where each time segment is 440 samples. If each time segment is compared to 44 different phonemes, the total number of states in a finite state machine representing the three minute long song would be approximately 792,000 states and the total number of paths under consideration would be on the order of 3.48e7. In some embodiments, each time segment is compared to thousands of different phonemes. While storing all paths for an entire song/item of audio data would allow for 100% accurate identification of the most likely path based on the aggregate state likelihood (i.e., path likelihood), the sheer number of calculations required to arrive at this certainty, as well as the storage requirements for arriving at this calculation is not practical with current computer hardware.

Although the finite state machines 400 illustrated in FIGS. 4A, 4B, and 4C only shows the most likely states, paths, and aggregate likelihoods for a few example time segments, in practice the finite state machine 400 can include all possible states, individual state likelihoods (and transition likelihoods, and aggregate path likelihoods) for all identified phonemes and all time segments for an item of audio data.

Although it is anticipated that in the future computer processing and data storage will be able to easily accommodate such calculations, in some implementations of the invention it is advantageous to prune the list of paths pursued as matching of time segments 401 progresses, so that only a subset of paths with the highest aggregate likelihood of matching are considered.

In one embodiment, the pruning module 212 compares the path likelihoods of the paths stored in active memory and discards paths with low path likelihoods at intervals depending on data processing and/or active memory storage limitations.

In another embodiment, the pruning module 212 takes advantage of the fact that the song lyrics for the audio data are already known. The pruning module 212 accesses the song lyric database 112 using the song tag associated with the audio data and obtains a set of song lyrics. The pruning module 212 decomposes each word in the set of song lyrics into separate phonemes and matches each phoneme to one or more states of each of the paths stored in active memory. With the known lyrics available, the pruning module 212 discards paths whose states do not match the order of the phoneme occurrences in the song lyrics. In some embodiments, the pruning module 212 discards paths not only based on path likelihoods but also based on the known lyrics for the audio data.

The intervals at which the pruning module 212 discards paths stored in active memory can occur after a predetermined number of time segments of the audio data have been matched. Alternatively, the intervals can occur depending on active memory storage limitations, for example after the active memory storage is a threshold percentage full (e.g., 80% full). Alternatively, the interval can be based on how many paths, including sub-paths of an as-of-yet incomplete path through the entire item of audio data, are currently stored in active memory, so as to maintain the number of paths (including sub-paths) stored in active memory to a set number or within a range. For example, once the number of paths stored grows beyond a predetermined threshold number of paths, the pruning module 212 may begin pruning after each match to keep the number of stored paths less than or equal the predetermined threshold. The number of paths stored before pruning may vary by implementation.

Figures 5A, 5B, 5C:
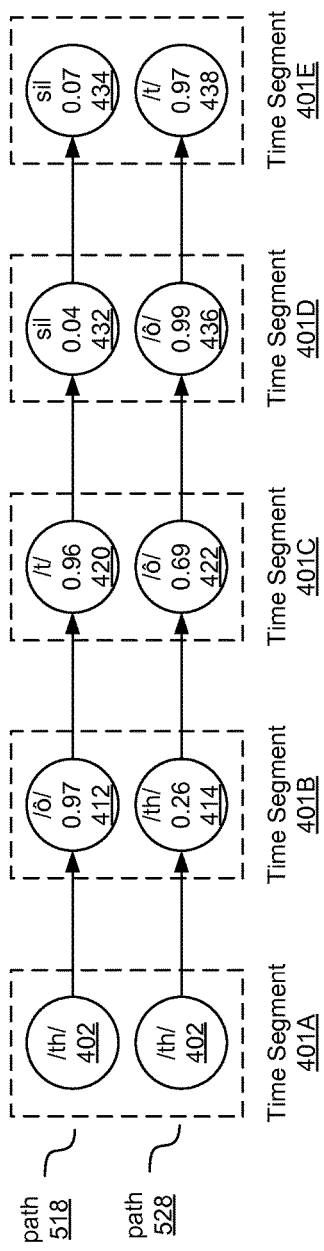
FIG. 5A illustrates two example paths of a finite state machine representing different possible mappings between timestamps and lyrical content, according to one embodiment.
FIG. 5B illustrates the example path likelihood matrix of one of the paths illustrated in FIG. 5A, according to one embodiment.
FIG. 5C illustrates the example path likelihood matrix of the other example path illustrated in FIG. 5A, according to one embodiment.

Pruning carries a risk, as the less possible sub-paths that are maintained in memory, the higher the risk that a local minimum in aggregate path likelihood will accidentally remove a sub-path having a high overall path likelihood when more time segments worth of data are taken into account. FIGS. 5A-5C illustrate an example of this.

FIG. 5A illustrates two possible paths, 518 and 528. The path 518 includes transitions from state 402 to 412 to 420 to 532 to 542 describing "/th/", "/ô/", "/t/" followed by silence spanning two time segments. Similarly, the path 528 includes transitions from state 402 to 414 to 424 to 534 to 544 describing "/th/" spanning two time segments, "/ô/" spanning two time segments, followed by "/t/." FIG. 5B illustrates associated likelihoods for path 518 and sub-paths of path 518 and FIG. 5C illustrates associated likelihoods for path 528 and sub-paths for path 528. The sub-paths illustrate the segment-by-segment growth of the paths, each sub-path with an associated sub-path likelihood.

FIGS. 5B and 5C are used in two different examples where the number of paths (or sub-paths) that can be stored during the duration of the set of song lyrics ("thought") is capped due to data processing and/or active memory storage limitations as introduced above. In a first example, assume the data processing and/or active memory storage limitations are such that information corresponding to only three segment's worth of paths can be stored (i.e., active memory is so limited that the sheer number of possible paths for three time segments of data maxes out active memory). In these examples, the pruning module 212 compares the aggregate path likelihoods of each possible sub-path and discards a sufficient number of the sub-paths with the lowest path likelihoods to clear space to process all possible sub-paths that will be added when the next time segment is processed.

In the first example, the pruning module 212 stores sub-path 514 and discards sub-path 524 since the path likelihood of sub-path 514 is 93.12% and the path likelihood of sub-path 524 is 17.94%. The sub-path 514 is the sub-path after three segments' worth of sub-paths of path 518 are stored and the sub-path 524 is the sub-path after three segments' worth of sub-paths of path 528 are stored. In this example, the pruning module 212 compares and discards sub-paths before processing the next time segment in order to free space in active memory. In other words, the pruning module 212 compares and discards sub-paths before processing the next time segment 401D. Notably, in discarding sub-path 524, sub-paths 526 and 528 do not occur.

In comparison, in a second example assume that the active memory is larger and can hold five segments-worth of paths. Assume the pruning module 212 acts similarly to the previous example, with the only difference being that more possible sub-paths (and possible states) can be maintained in active memory due to its larger size. In this example, the pruning module 212 stores path 528 and discards path 518 since the path likelihood of path 528 is 17.23% and the path likelihood of path 518 is 0.26%.

As illustrated in the first and second examples, the more sub-paths that can be stored in active memory, the less likely it is that a sub-path will be pruned due to having a local minima in aggregate path likelihood. For example, in one embodiment, at least 500,000 possible sub-paths are stored in active memory before pruning Once matching of all time segments is complete, and after the pruning module 212 performs any necessary discarding of paths in active memory with low path likelihoods, the selection module 214 selects a path in active memory with the highest path likelihood.

The sequencing module 216 matches the time segments 401 of the selected path to each word of the set of song lyrics. The sequencing module 216 associates a starting and ending timestamp to each word, where the starting timestamp is the starting timestamp of the time segment of the starting phoneme of the word, and where the ending timestamp is the ending timestamp of the time segment of the ending phoneme of the word. The sequencing module 216 may also assign a duration to each word, where the duration is the amount of time between the starting and ending timestamps.

IV. Censoring Audio Data

Figure 6:
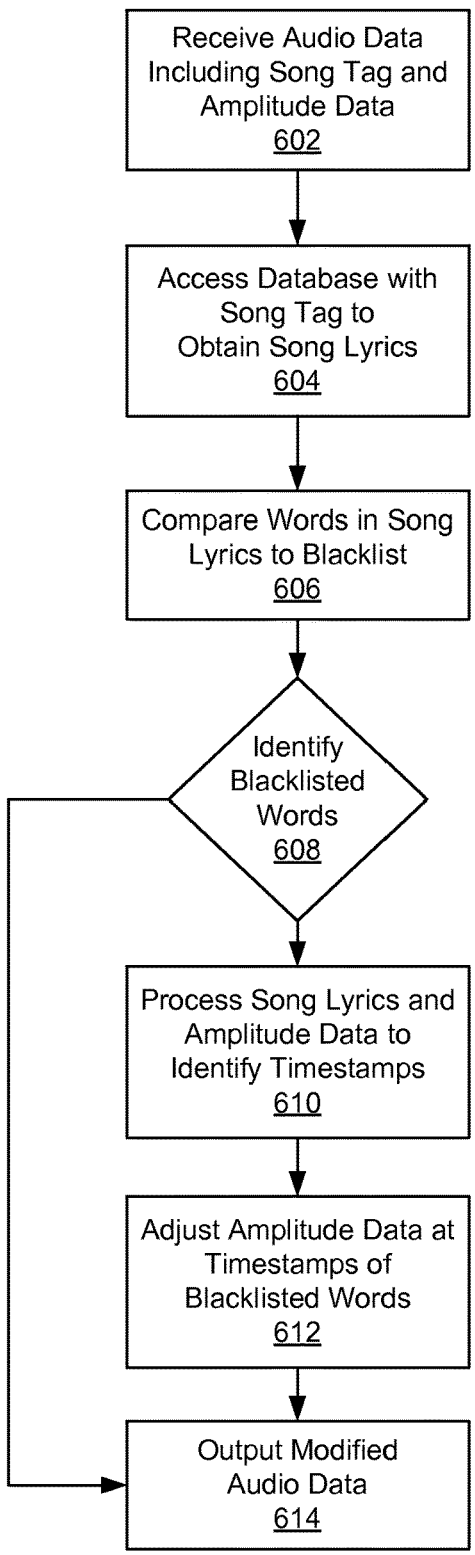
FIG. 6 is a flowchart of an example process for censoring audio data, according to one embodiment.

FIG. 6 illustrates a flow chart of a method for censoring audio data based on a set of song lyrics, according to one embodiment. The censoring system 110 receives 602 audio data from the content provider 102 via the network 106, the audio data including a song tag and amplitude data. The timestamp module 118 accesses 604 the song lyrics database 112 with the song tag and obtains a set of song lyrics. The set of song lyrics include a plurality of words matching the song identified by the song tag. The comparison module 120 compares 606 each word of the set of song lyrics to the words in the blacklist database 114 to identify 608 a subset of blacklisted words. If blacklisted words are identified 608, the timestamp module 118 processes 610 the amplitude data to identify timestamps in the amplitude data. Each timestamp indicates a time during the duration when one of the words from the set of song lyrics occurs in the amplitude data. The adjustment module 122 adjusts 612 the amplitude data at the timestamps of the blacklisted word occurrences to render the audio at the blacklisted words incomprehensible. The outputting module 124 outputs 614, or otherwise sends, modified audio data including the adjusted amplitude data to the content requester 104.

In one embodiment, if no blacklisted words are identified 608, the outputting module 124 outputs 614, or otherwise sends, the audio data to the content requester 104 without the timestamp module 118 processing 610 the set of song lyrics and the amplitude data and without the adjustment module 122 adjusting 612 the amplitude data. In one embodiment, the outputting module 124 outputs 614 unmodified audio data.

V. Computing Machine Architecture

Figure 7:
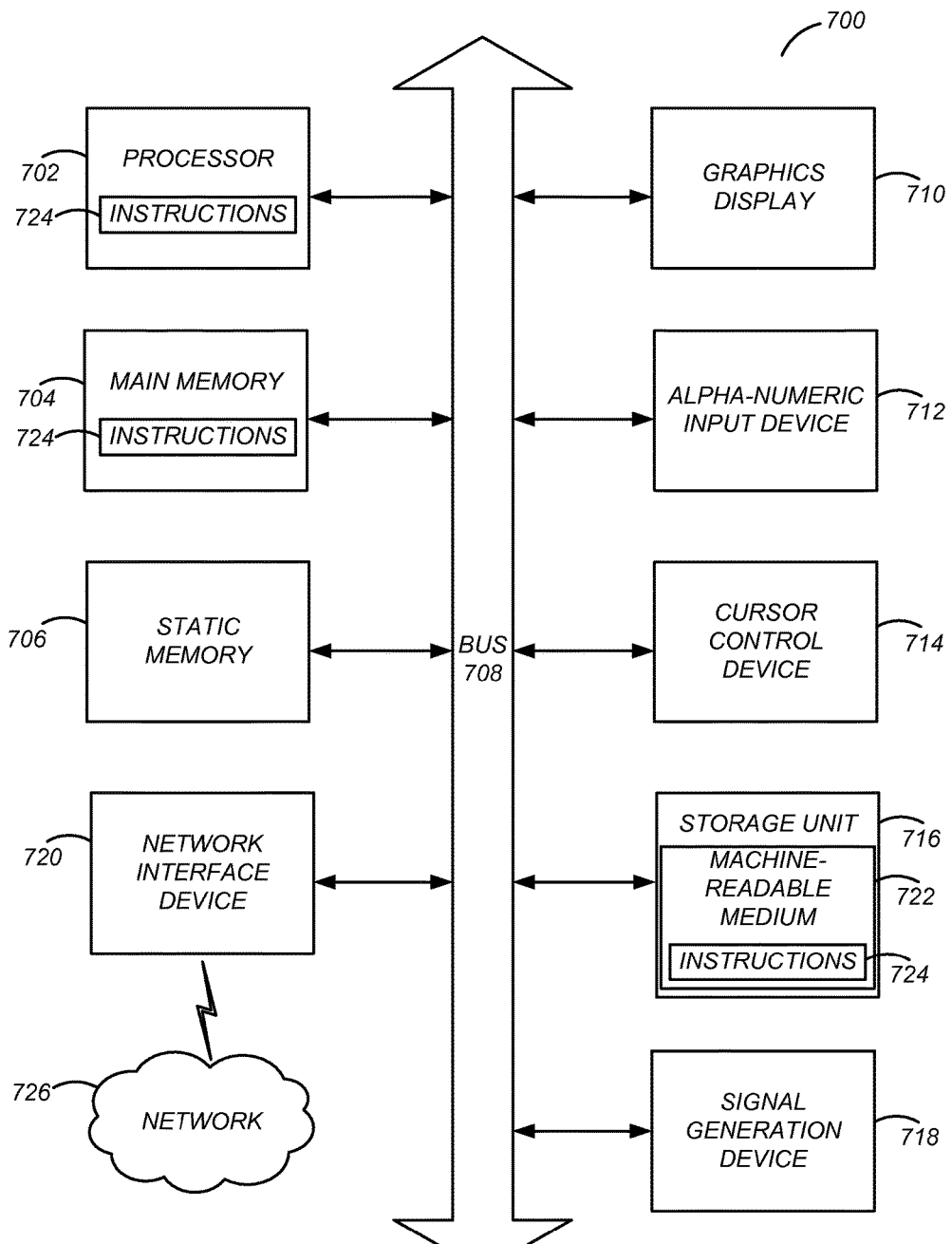
FIG. 7 illustrates one embodiment of components of an example machine able to read instructions from a machine-readable medium and execute them in a processor (or controller).

FIG. 7 is a block diagram illustrating components of an example computing device 700 able to read instructions from a machine-readable medium and execute them in a processor (or controller) for implementing the system and performing the associated methods described above. The computing device may be any computing device capable of executing instructions 724 (sequential or otherwise) that specify actions to be taken by that machine. Further, while only a computing device is illustrated, the term "computing device" shall also be taken to include any collection of computing devices that individually or jointly execute instructions 724 to perform any one or more of the methodologies discussed herein.

The example computing device 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computing device 700 may further include graphics display unit 710 (e.g., a plasma display panel (PDP), an organic light emitting diode (OLED) display, a liquid crystal display (LCD), a projector, or a cathode ray tube (CRT)) and corresponding display drivers. The computing device 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computing device 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

VI. Additional Configuration Considerations

Certain embodiments are described herein as including logic or a number of components, modules, or mechanisms, for example, as illustrated in FIGS. 1 and 2. Modules may constitute either software modules (e.g., code embodied on a machine-readable medium) or hardware modules. A hardware module is tangible unit capable of performing certain operations and may be configured or arranged in a certain manner. In example embodiments, one or more computing devices may include one or more hardware modules for implementing the operations described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The hardware or software modules may also operate to support performance of the relevant operations in a "cloud computing" environment or as a "software as a service" (SaaS). For example, at least some of the operations may be performed by a group of computing devices, these operations being accessible via a network (e.g., the Internet) and via one or more appropriate interfaces (e.g., application program interfaces (APIs)). The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative designs for a system and a process for censoring audio data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of censoring audio data comprising:
   receiving audio data comprising a tag and first amplitude data as a function of time, wherein the first amplitude data represents a plurality of spoken words occurring over a duration, as well as non-spoken word sounds overlapping with at least some of the spoken words during the duration;
   accessing a database with the tag to obtain a set of lyrics comprising a plurality of words;
   comparing the words in the lyrics to a blacklist to identify a subset of blacklisted words;
   processing, by a processor, both the set of lyrics and the first amplitude data together to identify a plurality of starting timestamps in the first amplitude data, each of the starting timestamps indicating a time during the duration when one of the subset of blacklisted words begins in the first amplitude data, wherein the processing comprises matching, by the processor, the first amplitude data to training data comprising second amplitude data representing identified spoken phonemes of at least one spoken word sound related to the subset of blacklisted words;
   identifying, by the processor, the plurality of starting timestamps based on the matching;
   adjusting, by the processor, the first amplitude data by replacing the first amplitude data starting at the starting timestamps of the subset of blacklisted words with other amplitude data to render the audio at the subset of blacklisted words inaudible; and
   providing, by the processor, the adjusted first amplitude data for playback of the audio data.

2. The method of claim 1, wherein the matching further comprises:
   segmenting the audio data into a plurality of time segments;
   transforming each of the time segments into first bins representing the first amplitude data as a function of frequency; and
   comparing the first bins of each time segment to second bins representing the second amplitude data, wherein the second amplitude data corresponds to positively identified occurrences of the at least one spoken word sound, or portions thereof, spoken over various non-spoken word sounds, the training data accessed from a training set database.

3. The method of claim 2, wherein the training set database comprises a plurality of categories, each of the categories representing a different one of the identified spoken phonemes, and each category representing one of the identified spoken phonemes spoken over a plurality of non-spoken word sounds.

4. The method of claim 3, wherein the matching comprises:
   identifying a plurality of matches between the first bins of each of the time segments and the second bins of one or more of the categories of the identified spoken phonemes; and
   computing, for each of the plurality of matches, a match likelihood indicating a numerical likelihood a category of the one or more categories corresponds to the time segment.

5. The method of claim 2, wherein the matching further comprises:
   determining a subset of the positively identified occurrences of the at least one spoken word sound to match against the bins of a current one of the time segments, the subset determined based on previously matched time segments occurring earlier in the audio data than the current time segment.

6. The method of claim 2, wherein the matching further comprises:
   calculating a phoneme match likelihood representing a degree of confidence that the first bins of each time segment match the second bins of one of the positively identified occurrences of the at least one spoken word sound; and storing the phoneme match likelihood in a database.

7. The method of claim 6, wherein the matching further comprises:
generating a finite state machine comprising a plurality of states, each of the plurality of states associated with one of the time segments and a possible phoneme match from the words of the set of lyrics, the possible phoneme match being represented by the phoneme match likelihood.

8. The method of claim 7, wherein the finite state machine further comprises a plurality of paths, each of the plurality of paths comprising a subset of the plurality of states associated with a different time segment, each of the plurality of paths further comprising an aggregate path likelihood that is based on the phoneme match likelihood of its constituent states.

9. The method of claim 8, wherein each of the plurality of paths further comprises:
a beginning state representing a phoneme at a first time segment;
an end state representing a phoneme at a second time segment; and
at least one or more intermediary states to transition from the beginning state to the end state, the at least one or more intermediary states representing time segments sequentially between the first and the second time segments.

10. The method of claim 8, wherein the matching further comprises:
identifying a subset of the paths having the highest aggregate path likelihoods; and
using the identified subset of the paths to determine which of a subset of the positively identified occurrences of the at least one spoken word sound to match against time segments that have not yet been matched.

11. The method of claim 10, wherein the number of the subset of the paths exceeds 500,000.

12. A system comprising:
a non-transitory computer-readable storage medium storing executable computer instructions that, when executed, perform steps comprising:
receiving audio data comprising a tag and comprising first amplitude data as a function of time, wherein the first amplitude data represents a plurality of spoken words occurring over a duration, as well as non-spoken word sounds overlapping with at least some of the spoken words during the duration;
accessing a database with the tag to obtain a set of lyrics comprising a plurality of words;
comparing the words in the lyrics to a blacklist to identify a subset of blacklisted words;
processing both the set of lyrics and the first amplitude data together to identify a plurality of starting timestamps in the first amplitude data, each of the starting timestamps indicating a time during the duration when one of the subset of blacklisted words begins in the first amplitude data, wherein the processing comprises matching the first amplitude data to training data comprising second amplitude data representing identified spoken phonemes of at least one spoken word sound related to the subset of blacklisted words;
identifying the plurality of starting timestamps based on the matching;
adjusting the first amplitude data by replacing the first amplitude data starting at the starting timestamps of the subset of blacklisted words with other amplitude data to render the audio at the subset of blacklisted words inaudible; and
providing the adjusted first amplitude data for playback of the audio data; and
a processor configured to execute the computer instructions.

13. The system of claim 12, wherein the instructions that, when executed, further perform steps comprising:
segmenting the audio data into a plurality of time segments;
transforming each of the time segments into first bins representing the first amplitude data as a function of frequency; and
comparing the first bins of each time segment to second bins representing the second amplitude data, wherein the second amplitude data corresponds to positively identified occurrences of the at least one spoken word sound, or portions thereof, spoken over various non-spoken word sounds, the training data accessed from a training set database.

14. The system of claim 13, wherein the training set database comprises a plurality of categories, each of the categories representing a different one of the phonemes, and each of the categories representing one of the phonemes spoken over a plurality of non-spoken word sounds.

15. The system of claim 14, wherein the instructions that, when executed, perform steps comprising matching further comprises instructions that, when executed, perform steps comprising:
identifying a plurality of matches between the first bins of each of the time segments and the second bins of one or more of the categories of the identified spoken phonemes; and
computing, for each of the plurality of matches, a match likelihood indicating a numerical likelihood a category of the one or more categories corresponds to the time segment.

16. The system of claim 13, wherein the instructions that, when executed, perform steps comprising matching further comprises instructions that, when executed, perform steps comprising:
determining a subset of the positively identified occurrences of the at least one spoken word sound to match against the bins of a current one of the time segments, the subset determined based on previously matched time segments occurring earlier in the audio data than the current time segment.

17. The system of claim 13, wherein the instructions that, when executed, perform steps comprising matching further comprises instructions that, when executed, perform steps comprising:
calculating a phoneme match likelihood representing a degree of confidence that the first bins of each time segment match the second bins of one of the positively identified occurrences of the at least one spoken word sound; and
storing the phoneme match likelihood in a database.

18. The system of claim 17, wherein the instructions that, when executed, perform steps comprising matching further comprises instructions that, when executed, perform steps comprising:
generating a finite state machine comprising a plurality of states, each of the plurality of states associated with one of the time segments and a possible phoneme match from the words of the set of lyrics, the possible phoneme match being represented by the phoneme match likelihood.

19. The system of claim 18, wherein the finite state machine further comprises a plurality of paths, each of the plurality of paths comprising a subset of the plurality of states associated with a different time segment, each of the plurality of paths further comprising an aggregate path likelihood that is based on the phoneme match likelihood of its constituent states.

20. The system of claim 19, wherein each of the plurality of paths further comprises:
   a beginning state representing a phoneme at a first time segment;
   an end state representing a phoneme at a second time segment; and
   at least one or more intermediary states to transition from the beginning state to the end state, the at least one or more intermediary states representing time segments sequentially between the first and the second time segments.

21. The system of claim 19, wherein the instructions that, when executed, perform steps comprising matching further comprises instructions that, when executed, perform steps comprising:
   identifying a subset of the paths having the highest aggregate path likelihoods; and using the identified subset of the paths to determine which of a subset of the positively identified occurrences of the at least one spoken word sound to match against time segments that have not yet been matched.

22. The system of claim 21, wherein the number of the subset of the paths exceeds 500,000.

* * * * *